US005892344A

United States Patent [19]

Cooley

[11] Patent Number: 5,892,344

[45] Date of Patent: Apr. 6, 1999

[54] POLICE DOORPOST CLAMP

[76] Inventor: James Cooley, 507 Woodstone Rd., Clinton, Miss. 39056

[21] Appl. No.: 638,652

[22] Filed: Apr. 29, 1996

[51] Int. Cl.[6] .......... B25J 15/02

[52] U.S. Cl. .......... 318/568.21; 24/455; 24/456; 24/494

[58] Field of Search .......... 318/568.21; 24/455, 24/456, 494

[56] References Cited

U.S. PATENT DOCUMENTS 3,833,238 9/1974 Liard .......... 24/455 X 4,714,399 12/1987 Olson .......... 24/455 X

*Primary Examiner*—Karen Masih

[57] ABSTRACT

A clamp that may be attached to a vehicle door to hold the door closed without damaging the vehicle is described. The device may be used by a police officer to secure the door of the vehicle, thereby preventing the occupants from opening the door suddenly and injuring the officer or fleeing. The mechanism for closing the clamp may be powered by a number of means, including an electrical motor, a hand pull, a spring, compressed air, and the like. The device includes a means for releasing the clamp when the officer no longer has reason to suspect that the occupants will injure him or flee.

11 Claims, 4 Drawing Sheets

POLICE DOORPOST CLAMP

BACKGROUND OF THE INVENTION

This invention relates to a vehicle door clamping mechanism and more particularly to a clamping mechanism for use by law enforcement officers to secure a front vehicle door in the closed position while interviewing a suspect seated in the vehicle.

In most situations, law enforcement officers do not know if a person pulled over for a traffic violation has a criminal record. The officer must approach the stopped vehicle with caution. While an officer can assume that every driver he stops is potentially dangerous, he cannot treat every citizen as though he were a wanted criminal. Thus, an officer must be alert to circumstances calling for quick action when approaching a vehicle, but he should not restrain a citizen without cause.

When an officer approaches a vehicle after requiring it to stop, preferred procedures call for the driver to remain in the vehicle and communicate with the officer through the driver's window. As the officer approaches the car to speak with the driver, he reaches a position where, if the driver's door were suddenly thrust open, the officer would be hit by the door. In order to prevent this from happening, an officer needs a device capable of securing the vehicle door in the closed position. Furthermore, the device must be such that the officer can use it with one hand (the hand not used to draw his or her weapon) and before he enters the dangerous area where the door would hit the officer. In addition, the device should be such that it can be applied to the vehicle quickly, and without damage to the vehicle. Once attached, the device must be in place securely, in a manner that makes it difficult for the driver to remove it. However, the device must also be such that the officer can remove it easily as soon as the officer is convinced that there is no danger.

I contacted 150 Mississippi law enforcement officers and asked each whether he would use a device with the characteristics described above. 149 said that they would, even if they had to purchase it themselves. Every officer stated that they considered an unsecured vehicle door to be a substantial threat to their safety when they approached a stopped vehicle. Some cited specific instances where they believed that fellow officers had been seriously injured or lost their lives after being suddenly hit with a vehicle door. They also pointed out that a suspect secured inside his vehicle cannot run away on foot. The most common comment from these officers was that they needed a way to gain 3 to 5 seconds during the period when a suspect began taking aggressive action, and that this device would provide them with that time. The officers also concluded that eliminating the suspect's ability to escape or take aggressive action with the car door, without diminishing the officer's ability to draw her or his weapon, would save officers' lives, perhaps their own.

SUMMARY OF THE INVENTION

The present invention is designed to fill the need described above by providing a means for holding a vehicle door closed without damaging the vehicle. More specifically, the present invention includes a clamping device which is applied to the doorpost of a vehicle through the window, from behind the front door and outside the vehicle. The device is intended for use by law enforcement officers, who would attach it by placing it into the open or partially-open window of the front door, sliding the clamping surfaces around the interior and exterior portions of the vehicle doorpost, and closing the clamp. The user closes the clamp by activating a means for drawing the clamp jaws toward one another and holding them there. The clamp may be released by de-activating the holding mechanism. Finally, the clamping surfaces are constructed of materials that do not scratch or otherwise damage the doorpost or interior window frame surfaces.

DESCRIPTION OF THE PREFERRED EMBODIMENTS

Figure 1:
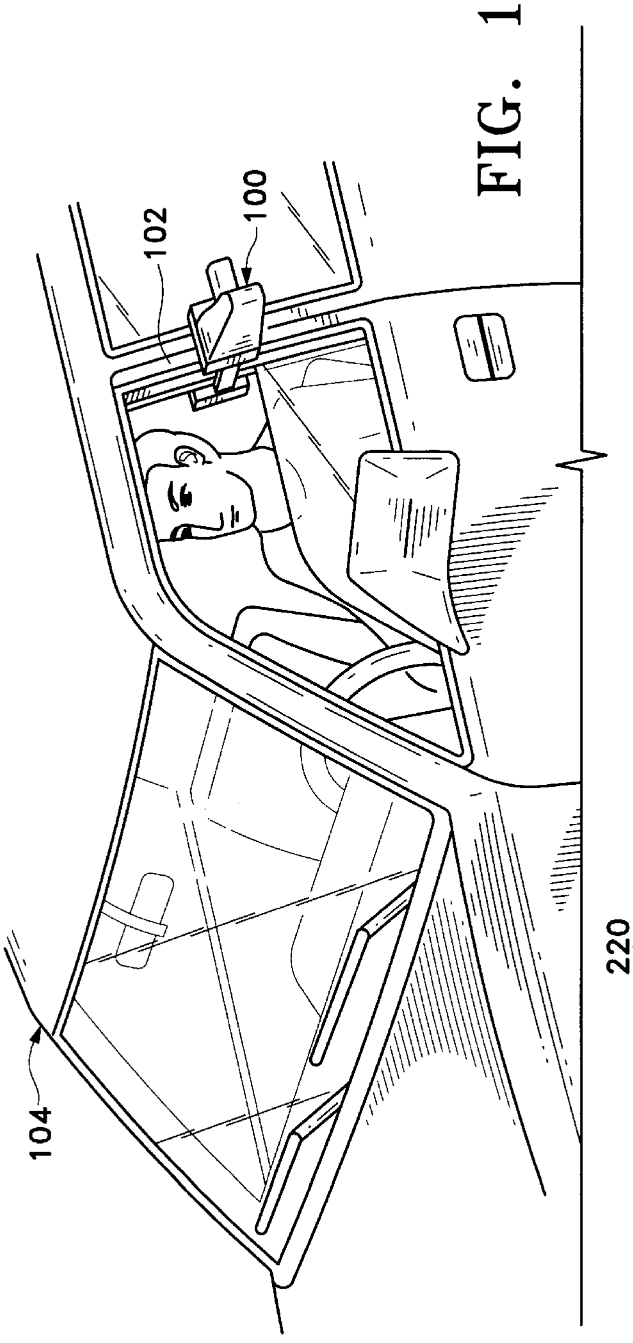
FIG. 1 illustrates the preferred embodiment of the invention in use protecting a law enforcement officer from a suspect inside a vehicle by clamping the left front door of a vehicle shut.

Referring to FIG. 1, there is shown a police doorpost clamp 100 incorporating the principles of this invention clamped on the doorpost 102 of vehicle 104.

Figure 2:
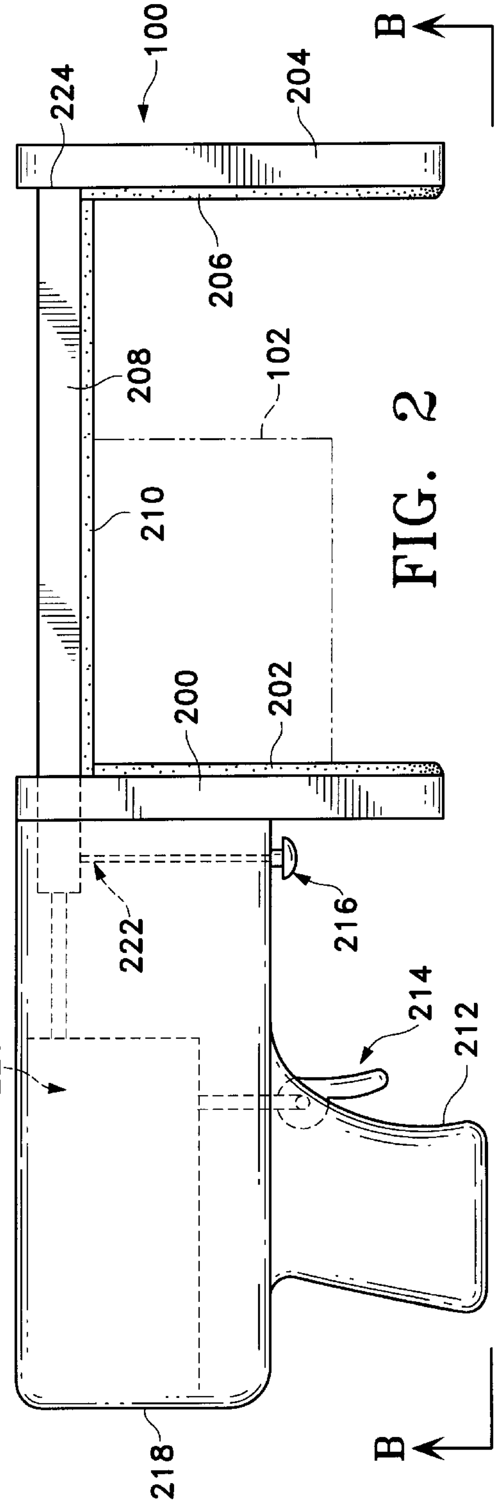
FIG. 2 is a top, elevation view showing the preferred embodiment of the present invention with the clamping faces fully open.
Figure 3:
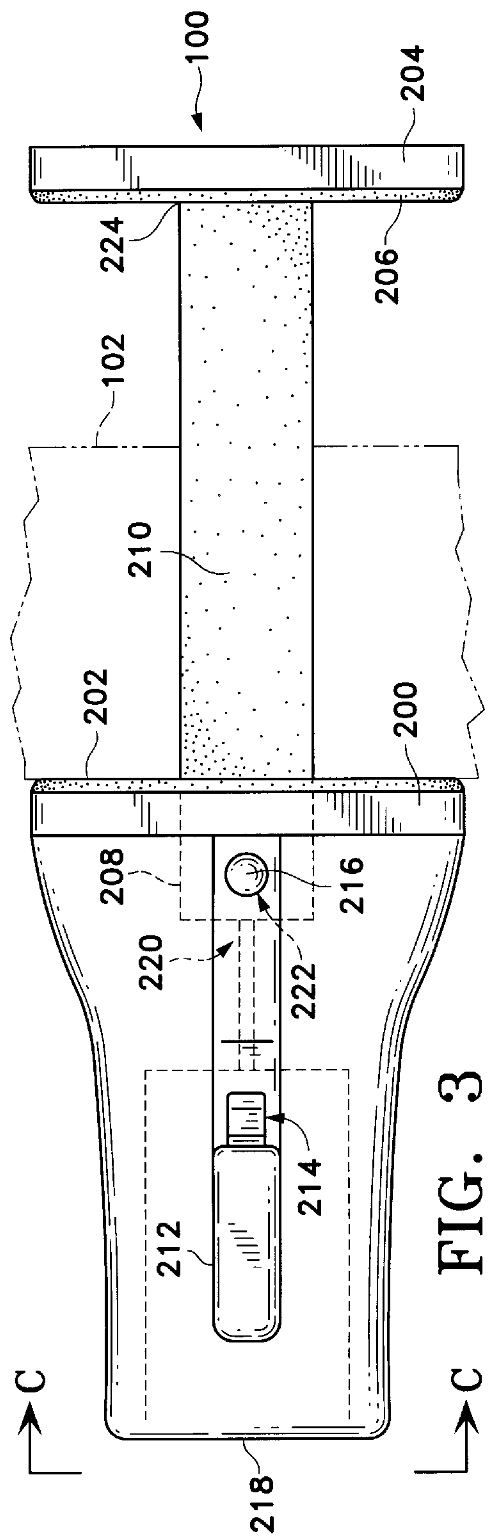
FIG. 3 is a view taken along B—B of FIG. 2.
Figure 5:
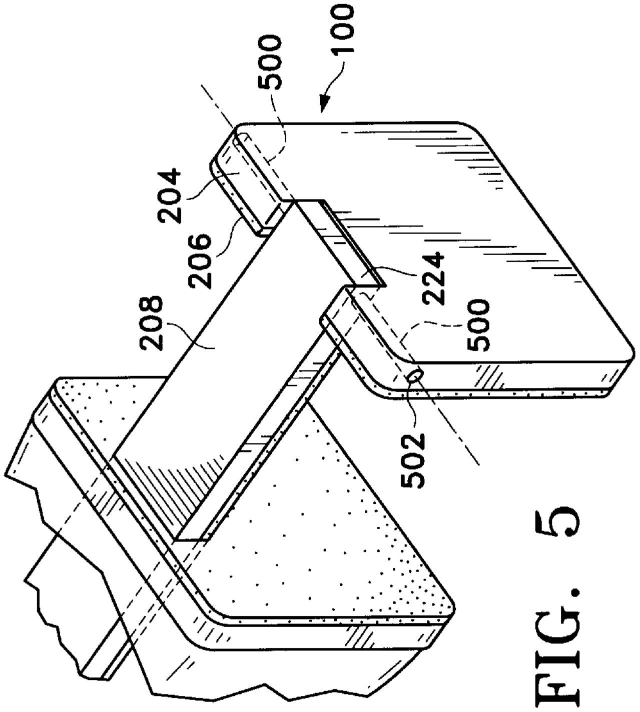
FIG. 5 illustrates the preferred embodiment with a pivoting mount for the moveable clamp face.
Figure 4:
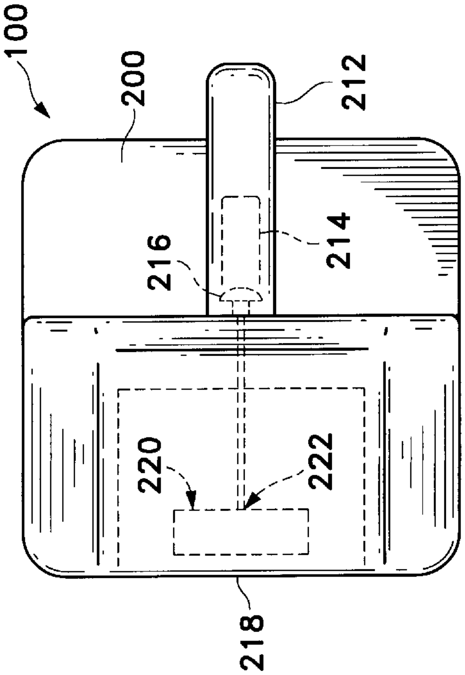
FIG. 4 is a view taken along C—C of FIG. 3.

FIGS. 2–4 illustrate a preferred embodiment of the present invention in the fully open position. Police doorpost clamp 100 consists of a first clamp jaw 200 with pad 202, a second clamp jaw 204 with pad 206, clamping bar 208 with padded edge 210, handle 212, user closing means 214, user release means 216, and housing 218 containing internal clamp closing means 220 and internal clamp release means 222. Jaw 200 and housing 218 may be molded from a single piece as illustrated in FIGS. 2–4. Likewise, jaw 204 and bar 208 may be molded from a single piece as illustrated in FIG. 2–4, or jaw 204 may be attached to bar 208 at end 224 of bar 208 as illustrated in FIG. 5. In the preferred embodiment of the present invention, the exposed clamp surfaces, such as the unpadded surface of bar 208 and the surface of housing 218, should be smooth, thereby making it more difficult to grip clamp 100 while it is clamped on doorpost 102. The distance between fixed jaw 200 and moveable jaw 204 is determined by the position of sliding bar 208 with respect to housing 218. Closing means 220 is attached to bar 208, and when used as intended, internal closing means 220 is enabled by user closing means 214, thereby causing bar 208 to pull the inner face of jaw 204 with pad 206 toward the inner face of jaw 200 with pad 202 until vehicle doorpost 102 between jaws 200 and 204 becomes tightly clamped between pads 202 and 206. Internal release means 222 is engaged by user release means 216, thereby disengaging means 220 and unclamping doorpost 102. Clamp 100 may be reset for next use by returning clamp 100 to its fully open position as illustrated in FIGS. 2–4.

The preferred dimensions of the inner clamp jaw faces, padded clamping bar and housing illustrated in FIG. 2–4 are as follows: The inner faces of jaws 200 and 204 may be 2 to 7 inches square and 0.25 to 2 inches thick (5" and 0.5" most preferred). In order to fit a variety of doorpost widths in the range 3 to 6 inches, the distance between jaws 200 and 204 should be at least 7 inches when clamp 100 is open, and the maximum movement of bar 208 should be at least 4 inches. Housing 218 must be of sufficient size to contain internal closing means 220 and to permit clamping bar 208 to move up to at least 4 inches to the left in FIG. 2.

In the preferred embodiment of the present invention illustrated in FIG. 5, moveable clamp jaw 204 is mounted on clamp shaft 500 which is attached to end 224 of bar 208. As shown in FIG. 5, shaft 500 extends through clamp shaft hole 502 horizontally through the width of clamp jaw 204 in such a manner that jaw 204 can rotate several degrees in each direction about the axis determined by shaft 500. The purpose of incorporating the pivoting clamp jaw is to increase the contact surface area between pad 206 and sloped doorposts. In the preferred embodiment, the pivot angle is limited by the shape of shaft 500 and shaft hole 502 using means well know to those skilled in the art. This is necessary to ensure that jaw 204 will not be out of position when clamp 100 is applied to doorpost 102.

As described above, in the preferred embodiment of the present invention, the inner faces of jaws 200 and 204 and bar 208 are covered with pads 202, 206 and 210, respectively. One purpose of pads 202 and 206 is to increase the friction between jaws 200 and 204 and doorpost 102, thereby increasing the grip of the present invention on doorpost 102 and securing the door of vehicle 104. Another purpose of pads 202, 206 and 210 is to protect doorpost 102 and vehicle 104 from being scratched by the surfaces of jaws 200 and 204 and bar 208, respectively. Therefore, the pads should cover their respective inner clamp jaw faces sufficiently to protect doorpost 102 from scratches and to insure adequate contact between surfaces for strong clamping action on doorpost 102. These pads may be rubber, or any sufficiently elastic, durable material with a high coefficient of friction. As described more fully below, the thickness and elasticity of pads 202 and 206 should be such that means 220 can provide strong clamping action on doorpost 102. In the preferred embodiment of the present invention, pads 202 and 206 may be replaced when worn out.

Figure 6:
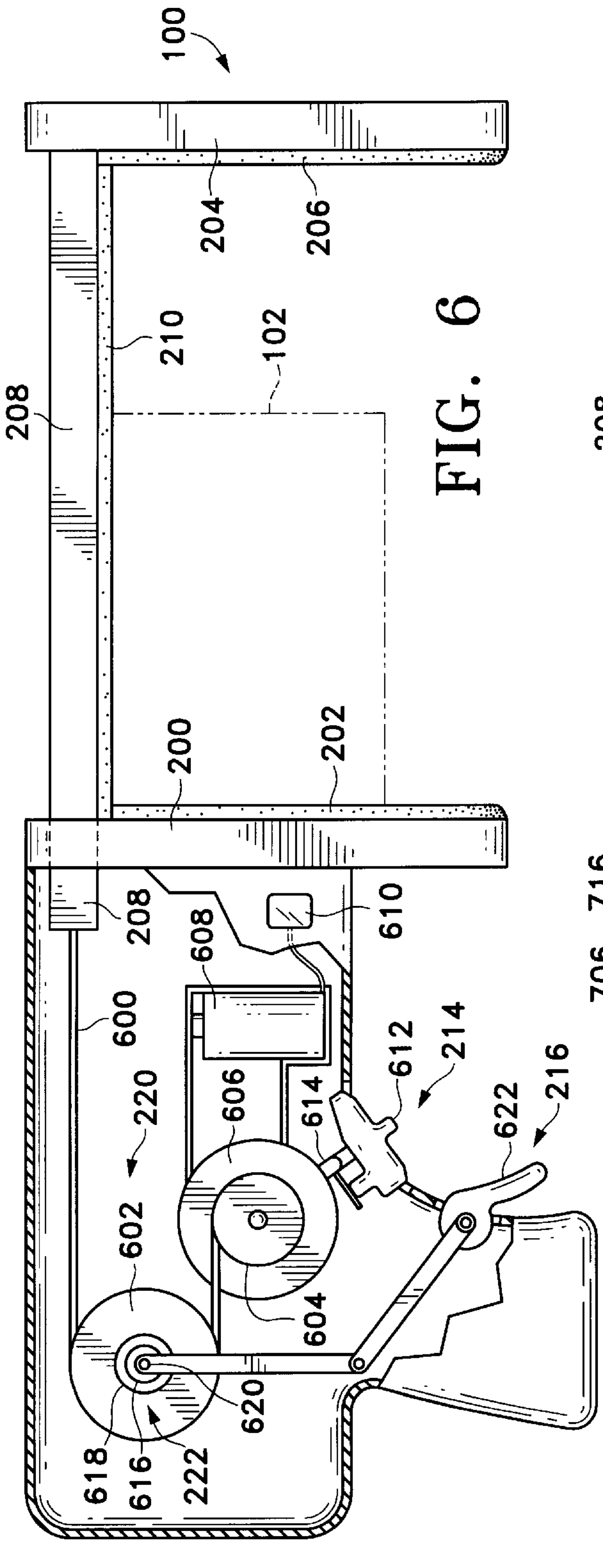
FIG. 6 illustrates the preferred embodiment driven by an electrical motor.

As shown in FIG. 6, internal closing means 220 may be bar 208 attached by belt 600 wound to pulley 602 driven through drive 604 by servomotor 606, which may be powered by battery 608. Said battery 608 may be of the disposable or rechargeable, conventional, or solar type, and should be continuously monitored with condition of charge displayed by display 610 by means well known in the art. Said servomotor may be capable of breaking automatically and holding when a threshold feedback load is applied. In the case where means 220 comprises a servomotor-driven pulley and belt, user closing means 214 may be toggle switch 612 which is in electrical communication 614 with motor 606, and thereby turns motor 606 on in the "on" position and off in the "off" position. If motor 606 is of the type that automatically breaks and holds when a feedback threshold load occurs, the desired threshold is set in the preferred embodiment of the invention, and the user merely turns switch 612 to "on" to clamp doorpost 102, and to "off" to release clamp 100 from doorpost 102. On the other hand, if motor 606 is not of the type that automatically breaks and holds, brake 616 and clutch 618 should be present, with brake 616 in electrical communication with switch 612 and activated electronically when switch 612 is in said "off" position. In this embodiment, the user must turn switch 612 first to "on" and thence to "off" to cause the clamping action of clamp 100 on doorpost 102. Internal clamp release means 222 may be clutch 618, which may release pulley 602 from drive 604 or belt 600 from pulley 602. In either case, user release means 216 is clutch release shaft 620 and clutch trigger 622, which are connected to clutch 618 and thereby engage and disengage clutch 618 by means well know in the art when trigger 622 is operated by the user. User release means 216 should also be in electrical communication with and disengage brake 616. Thus, in this embodiment of the present invention, clutch 618 is engaged before motor 606 is "on," continues to be engaged while clamp 100 is in place on doorpost 102, but is disengaged by user release means 216 when the user is ready to remove clamp 100 from doorpost 102. Brake 616, on the other hand, is not engaged until motor 606 is "off," and is disengaged by user release means 216.

EXAMPLE 1

A series 80000 pancake stepper motor (Haydon Switch and Instrument, Inc., Waterbury, Conn.) or a facsimile thereof could be used as servomotor 606. The 80000 series motor has a maximum diameter of 3.15" and is ⅜" thick. This motor uses U.S. Pat. No. 4,714,853, in which the coils are mounted inside one another and the magnetic rotor is a ring that is located between the coils. The 80240-12, for example, has an operating voltage of 12 v, a power consumption of 6 watts, and weighs 7.75 oz.

EXAMPLE 2

The Milwaukee #48-11-0200 battery pack or a facsimile thereof may be used as battery 608. The Milwaukee #48-59-0166 battery charger may be used to recharge the #48-11-0200 battery pack, usually in less than an hour.

Figure 7:
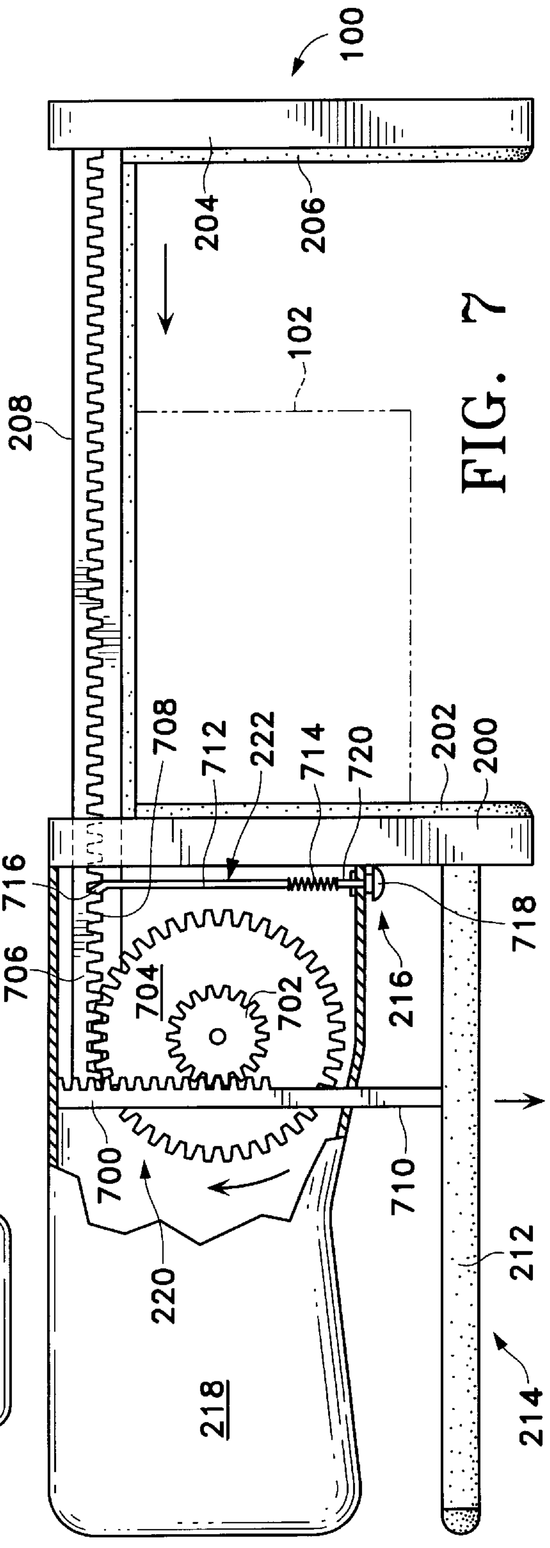
FIG. 7 illustrates the preferred embodiment driven by hand pull.

Alternatively, internal clamp closing means 220 may be gear wheels and connecting gear shafts. In the preferred embodiment of the present invention as shown in FIG. 7, means 220 comprises a first toothed gear shaft, 700, a top gear wheel 702, a bottom gear wheel 704, and a second gear shaft 706 with teeth 708, which is incorporated in sliding bar 208. Wheel 702 is affixed to wheel 704 with common center points, and the teeth on wheel 702 mesh the teeth on shaft 700 and the teeth on wheel 704 match teeth 708. The ratios of the diameters of said top wheel 702 and said bottom wheel 704 should be in the range of the desired linear distance for movement of handle 212 divided by the desired linear distance for movement of jaw 204. User closing means 214 comprises handle 212 and handle shaft 710, which connects shaft 700 to handle 212. When handle 212 is pulled away from housing 218, shaft 700 causes wheel 702 to rotate, which causes wheel 704 rotate at the same number of rotations per minute as wheel 702, which causes shaft 706 and sliding bar 208 to move to the left, thereby causing clamp jaw 204 and pad 206 to move toward jaw 200 and pad 202 until vehicle doorpost 102 is tightly clamped shut. The distance jaw 204 and pad 206 move is determined by the ratio of the radii of wheel 704 to wheel 702 times the distance handle 212 is moved away from housing 218 until pads 202 and 206 clamp doorpost 102 closed:

D(jaw 204)=D(handle 212)×radius(wheel 704)/radius (wheel 702) whereas the clamping force, F(jaw 204) resulting from user applied force, F(handle 212) is:

F(jaw 204)=F(handle 212)×radius(wheel 702)/radius wheel 704).

If the applied force is a gripping force supplied by the user, the radii of wheels 702 and 704 must be selected to accommodate normal user gripping distances and forces.

EXAMPLE 3

If the user gripping distance is 2" and jaw 204 might have to close as much as 4", the radius of wheel 702 should be one half the radius of wheel 704, but the clamping force applied by the user will be only half the force of her or his grip.

On the other hand, where the applied force is a pulling force supplied by the user, the ratio of the radii of wheels 702 and 704 and the resulting clamping force are constrained by the distance jaw 204 might be required to move and the user pulling distance, which can be substantially greater than her or his gripping distance.

EXAMPLE 4

If the user pulling distance is 8" and jaw 204 might have to close as much as 4", the radius of wheel 702 may be twice the radius of wheel 704, and the clamping force applied by the user will be twice the force of her or his pull.

Since such pulling force is also substantially greater than said gripping force, the preferred embodiment of the present invention uses the pulling handle mechanism in user release means 216.

In the case where means 220 includes shaft 706 with teeth 708, internal clamp release means 222 may be angle rod 712 held against teeth 708 of shaft 706 by one or more springs 714, until released by user release means 216. As shown in FIG. 7, the angled end, 716, of rod 712 is angled to the left, which, by means well known to those skilled in the art, permits teeth 708 of shaft 706 to move to the left, but prevents shaft 706 from moving to the right unless end 716 of rod 712 is withdrawn from teeth 708 of shaft 706. Release means 216 comprises a grasping means 718 at the unangled end 720 of rod 712 which may be used to overcome the tension of springs 714, thereby withdrawing end 716 of rod 712 from teeth 708 of shaft 706, releasing pad 206 from doorpost 102 and permitting clamp 100 to be reset to its fully open position for next use.

In the preferred embodiment of the present invention using the internal release means illustrated in FIG. 7, teeth 708 on shaft 706 should be closely spaced. This is because end 716 of rod 712 does not position shaft 706 continuously, and the final clamping position of face 204 is a discrete set of points D(teeth 708) apart. Adequate clamping action for clamp 100 is achieved by selecting the pitch of teeth 708 to be sufficiently small that the elasticity of pads 202 and 206 accommodates at least one half of D(teeth 708) without substantial loss in F(jaw 204).

EXAMPLE 5

If the pitch of teeth 708 is 16/inch, then each pad must accommodate 1/32" without substantial loss of clamping force on doorpost 102.

Figure 8:
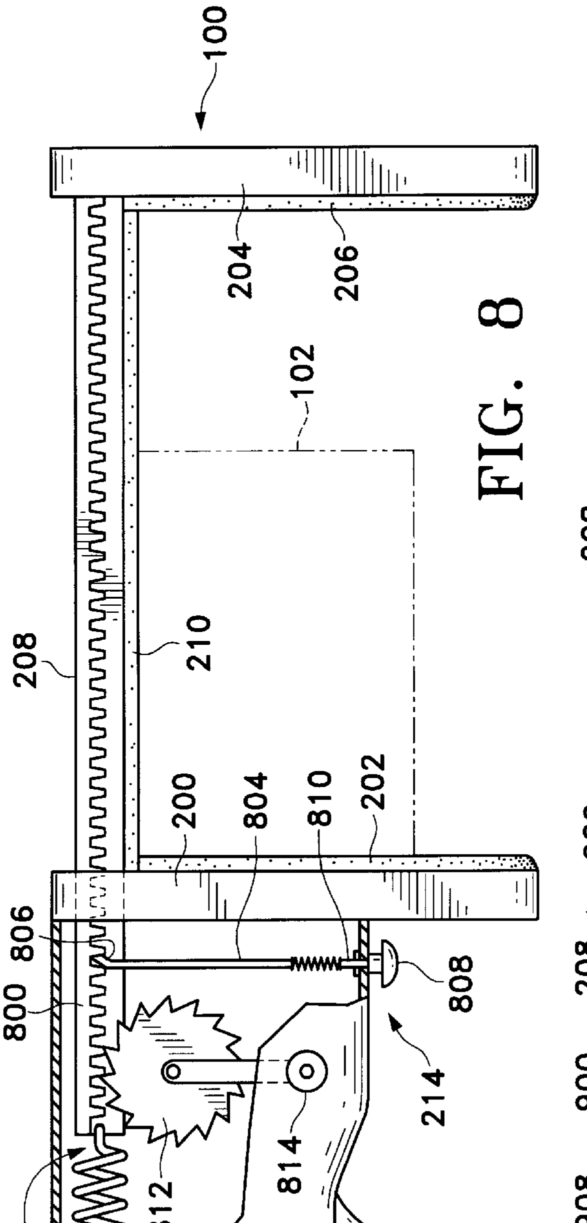
FIG. 8 illustrates the preferred embodiment driven by spring tension.

Alternatively, internal clamp closing means 220 may be a spring. In the embodiment of the present invention shown in FIG. 8, means 220 comprises bar 208 attached by toothed shaft 800 to spring 802. In the embodiment illustrated in FIG. 8, shaft 800 may be incorporated into bar 208. The maximum tension on spring 802 is set when clamp 100 is reset in the fully open position, and held by angle rod 804, which is angled to the right at end 806 where it engages the teeth of shaft 800. In the case where means 220 comprises such a spring-pulled shaft, user closing means 214 may be grasping means 808 attached to the unangled end 810 of rod 804. When the user pulls grasping means 808, end 806 is disengaged from the teeth of shaft 800, and the tension in spring 802 is released, thereby pulling bar 208 and clamp jaw 204 to the left, and closing clamp 100 on doorpost 102. Clamp 100 may be held closed or released by a variety of means, including the internal clamp release means and the user release means disclosed in connection with FIG. 7. Alternatively, as illustrated in FIG. 8, clamp 100 may be held closed by sufficient residual tension in spring 802, and reopened by cranking rachet 812, using handle 814, or another mechanism well known in the art, to reset full tension on spring 802.

Figure 9:
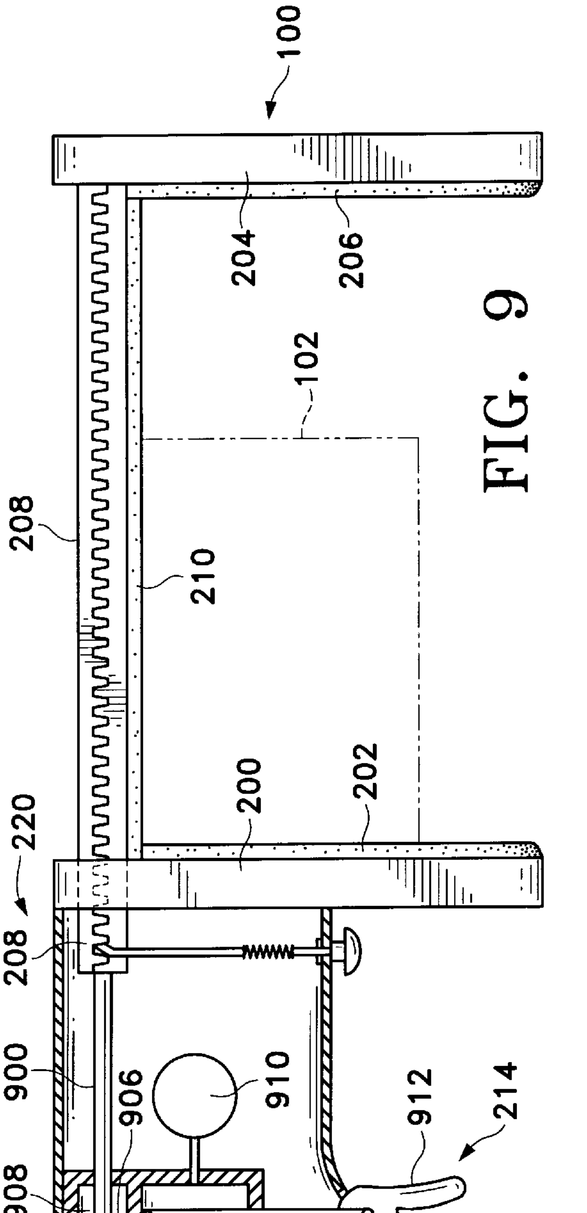
FIG. 9 illustrates the preferred embodiment driven by compressed air.

Alternatively, internal clamp closing means 220 may be a chambered piston driven by compressed air and connection piston rod and shaft. In the preferred embodiment of the present invention as shown in FIG. 9, means 220 comprises bar 208 attached by piston rod 900 to piston 902 which may be driven to the left in FIG. 9 by releasing compressed air stored in compressed air chamber 904 through valve 906 into a second chamber 908 which contains piston 902. Like shaft 706 in FIG. 706, rod 900 may be toothed and incorporated in bar 208 or it may be connected to bar 208 by a toothed shaft. Using pump 910, the air in chamber 904 may be compressed before using clamp 100 by means well known in the art. For example, pump 910 may be similar to air-compressing devices used in air rifles. In the case where means 220 comprises such a air-driven piston, user closing means 214 may be valve trigger 912 connected to valve 914 by valve shaft 916. Pulling trigger 912 causes valve 906 to open, thereby releasing air into chamber 908 and driving piston 902 to the left. This causes rod 900 to pull bar 208 and clamp jaw 204 to the left, thereby closing clamp 100 on doorpost 102. Clamp 100 may be held closed or released by a variety of means, including the internal clamp release means and the user release means disclosed in connection with FIG. 7.

Alternatively, a small explosive cartridge, or numerous other means that are obvious to those skilled in the art could be used in the present invention.

I claim:

1. A vehicle doorpost clamping device comprising a clamp with two jaws, each with a padded surface facing a padded surface of the other jaw, hinged by a padded closing bar attached to the back of each such jaw such that the padded surface of the first jaw is parallel or nearly parallel to the padded surface of the second jaw, said padded jaw surfaces and said closing bar are juxtaposed such that when said clamp is closed onto a doorpost of a vehicle with a first doorpost surface facing outside said vehicle and a second doorpost surface facing inside said vehicle, there is contact between said padded surface of said first jaw and said outside surface of said doorpost of said vehicle, said padded surface of said second jaw and said inside surface of said doorpost, and said padded closing bar and a surface of a window frame facing away from said doorpost of said vehicle of a window in a front door of said vehicle closed into said doorpost of said vehicle, and said contact between said clamp and said doorpost and said window frame is such that, when said clamp is closed, an individual inside said vehicle is impeded from opening said door and removing said clamp for a period of at least fifteen seconds, and said padding is such that said doorpost, door and window frame are not scratched by said clamp when it is attached to said doorpost;

an internal closing means connected to said clamp that moves said padded surface of said second jaw toward said inside surface of said doorpost while said padded surface of said first jaw is against said outside surface of said doorpost and said padded closing bar is against or nearly against said window frame surface until said padded surfaces of said jaws are clamped on said doorpost with sufficient force to impede an individual inside said vehicle from opening said front door and removing said clamp for a period of at least fifteen seconds when said clamp is closed;

a user closing means attached to said internal closing means that causes said internal closing means to close when activated by a user of said clamping device, thereby impeding an individual inside said vehicle from opening said front door and removing said clamp;

an internal release means attached to said clamp that releases said force holding said second jaw on said inside surface of said doorpost, thereby releasing said internal closing means and permitting said clamp to relax; and a user release means attached to said internal release means that activates said internal release means when triggered by a user of said clamping device, thereby permitting removal of said clamping device.

2. The device in claim 1 wherein said second jaw is attached to said bar with a pivot shaft which allows said second jaw to pivot several degrees on its axis of attachment to said bar, thereby increasing the contact surface area between said second jaw surface and inside doorpost surfaces of various angles.

3. The device in claim 1 wherein said first jaw is incorporated into a housing for said device.

4. The device in claim 1 wherein said second jaw and said bar are incorporated into the same structural unit.

5. The device in claim 1 wherein the power closing said clamp is supplied by a servomotor.

6. The device in claim 5 wherein said internal closing means and said internal release means comprise an automatically braking servomotor with an on/off switching mechanism connected by a driveshaft to a pulley which is connected to said clamping bar by a belt such that, when said servomotor is turned on, said driveshaft, pulley and belt rotate, and said clamping bar moves said second clamp jaw toward said first clamp jaw, thereby closing said clamp on said doorpost until said servomotor is turned off; and said user closing means and said user release means comprise a toggle switch in electrical communication with the on/off switching mechanism of said servomotor such that, when said toggle switch is switched on, said servomotor is activated, and, when said toggle switch is switched off, said servomotor is switched off.

7. The device in claim 1 wherein the power closing said clamp is supplied through a gear drive mechanism.

8. The device in claim 7 wherein said user closing means comprises a handle attached to a handle shaft;

said gear drive mechanism comprises a first toothed gear wheel connected to said handle by a first toothed gear shaft and said handle shaft and affixed with common centers atop a second gear wheel, and a second toothed gear shaft which engages the teeth of said second toothed gear wheel and is connected to said clamping bar, such that when said handle is pulled by a user, said first gear wheel rotates causing said second gear wheel to rotate on the same axis and with the same angular velocity as said first gear wheel, in turn causing said second gear shaft to move as said second gear wheel rotates, in turn causing said second gear shaft and said bar to move, thereby closing said clamp on said doorpost;

said internal clamp closing mechanism comprises said gear drive mechanism and an angled end of an angle rod held within the teeth of said second toothed gear shaft by a spring until said angled end of said angle rod is withdrawn when said internal clamp release means is activated by the user with said user release means;

said internal clamp release means comprises an unangled end of said angle rod; and said user release means comprises a grasping means attached to said unangled end of said angle rod and suitable for grasping by a user.

9. The device in claim 1 wherein said internal clamp closing means comprises a toothed shaft connected to said closing bar such that said clamp may be closed and opened by movement of said shaft, a spring attached to said shaft such that said spring is fully compressed when said clamp is open and said spring is partially compressed when said clamp is closed, an angled end of an angle rod which is engaged in the teeth of said toothed shaft when said spring is fully compressed;

said internal clamp release means comprises a toothed rachetting means with teeth meshed in the teeth of said shaft;

said user release means comprises a handle attached to said rachetting means such that when said handle is turned by the user, said rachetting means causes said shaft to fully compress said spring, thereby opening said clamp; and said user closing means comprises a grasping means suitable for grasping by the user that is attached to an unangled end of said angle rod, such that the user may withdraw said angled end of said angle rod from the teeth of said shaft, thereby causing said clamp to close while maintaining a residual tension in said spring sufficient to maintain closure.

10. The device in claim 1 wherein said internal clamp closing means comprises a toothed shaft connected to said closing bar such that said clamp may be closed and opened by movement of said shaft, a piston rod attached to said shaft, a piston attached to said piston rod, a cylinder containing said piston and through which said piston may move such that said piston occupies substantially less of the volume of said cylinder when said clamp is open than when said clamp is closed, a control valve, a compressed air chamber connected to said cylinder on a side of said piston where said rod is attached to said piston, an angled end of an angle rod which is engaged in the teeth of said toothed shaft when said clamp is closed;

said internal clamp release means comprises an unangled end of said angle rod;

said user closing means comprises a valve shaft connected to said control valve, and a valve trigger connected to said control valve such that when said trigger is pulled by the user, said control valve opens and permits compressed air to flow from said compressed air chamber into said cylinder, thereby forcing said piston to occupy a substantially larger volume of said cylinder and closing said clamp;

said user release means comprises a grasping means attached to said unangled end of said angle rod such that the user may withdraw said angled end of said angle rod from the teeth of said shaft, thereby releasing said clamp.

11. The device in claim 5 wherein said internal closing means comprises a servomotor with an on/off switching mechanism connected by a drive-shaft with a brake with an engagement/disengagement switching mechanism to a pulley which is connected to said clamping bar by a belt such that, with said brake disengaged, when said servomotor is turned on, said driveshaft, pulley and belt rotate, and said clamping bar moves said second clamp jaw toward said first clamp jaw, thereby closing said clamp on said doorpost, and, when said brake is engaged, holding said clamp on said doorpost when said servomotor is turned off;

said internal release means comprises a clutch with an engagement/disengagement switching mechanism which, when engaged, releases said internal closing means from said clamping bar when said servomotor is off and said brake is disengaged;

said user closing means comprises a toggle switch in electrical communication with said on/off switching mechanism of said servomotor and with said engagement/disengagement switching mechanisms of said brake and said clutch, such that, when said toggle switch is switched on, said clutch is disengaged, and said servomotor is activated, thereby closing said clamp on said doorpost and, when said switch is turned off, said brake is engaged, thereby holding said clamp closed on said doorpost; and said user release means comprises a trigger connected by said clutch shaft to said engagement/disengagement mechanisms of said clutch and said brake, such that, when said trigger is pulled, said clutch is engaged and said brake is disengaged, thereby releasing said clamp from said doorpost.

* * * * *